US009587550B2

(12) United States Patent
Gaiser

(10) Patent No.: US 9,587,550 B2
(45) Date of Patent: Mar. 7, 2017

(54) EXHAUST SYSTEM

(75) Inventor: Gerd Gaiser, Reutlingen (DE)

(73) Assignee: Eberspächer Exhaust Technology GMBH & CO. KG, Neunkirchen (DE)

(*) Notice: Subject to any disclaimer, the term of this patent is extended or adjusted under 35 U.S.C. 154(b) by 1631 days.

(21) Appl. No.: 13/185,570

(22) Filed: Jul. 19, 2011

(65) Prior Publication Data
US 2012/0017576 A1 Jan. 26, 2012

(30) Foreign Application Priority Data
Jul. 22, 2010 (DE) .................. 10 2010 031 853

(51) Int. Cl.
F01N 3/02 (2006.01)
F01N 13/14 (2010.01)
F01N 3/28 (2006.01)

(52) U.S. Cl.
CPC .............. F01N 13/14 (2013.01); F01N 3/28 (2013.01); F01N 13/146 (2013.01); F01N 2260/08 (2013.01)

(58) Field of Classification Search
CPC ...... F01N 13/14; F01N 13/143; F01N 13/146; F01N 3/28; F01N 2260/08
USPC .................... 60/274, 287, 320, 321
See application file for complete search history.

(56) References Cited

U.S. PATENT DOCUMENTS 3,457,723 A * 7/1969 Kerns .............................. 60/299
3,563,030 A * 2/1971 Lentz et al. .................... 60/288
3,672,171 A * 6/1972 Eknayan ................... F01N 3/04
  422/174
3,802,333 A * 4/1974 Barber-Perez ........... A23B 9/26
  99/472
4,147,031 A * 4/1979 Tanuma et al. .................. 60/278
5,117,677 A * 6/1992 Hendershot ............. G01M 3/32
  340/605
6,162,403 A 12/2000 Foster et al.
6,203,764 B1 * 3/2001 Benson ................ B01D 53/944
  422/171
8,661,800 B2 * 3/2014 Levin et al. .................... 60/320
2006/0213566 A1 * 9/2006 Johnson .................... F16L 9/18
  138/111
2007/0065349 A1 * 3/2007 Merry ........................... 422/179

(Continued)

FOREIGN PATENT DOCUMENTS

DE 102006050847 A1 5/2007
DE 10 2006 011889 A1 9/2007

(Continued)

Primary Examiner — Thomas Denion
Assistant Examiner — Matthew T Largi
(74) Attorney, Agent, or Firm — McGlew and Tuttle, P.C.

(57) ABSTRACT

A component of an exhaust system for a combustion engine, particularly of a motor vehicle, has a hollow jacket at least partially surrounding the component. An intermediate space is surrounded by the walls of the hollow jacket and is closable in a pressure-tight manner. The intermediate space is fluidically connected to a vacuum generating device via a vacuum connection line and via a vacuum connection point of the component. With the vacuum generating device, a vacuum can be generated in the intermediate space. Through arrangement of a filler material, such as a support structure and/or of a fiber material and/or of a foam, in the intermediate space the stability of the hollow jacket can be improved.

20 Claims, 1 Drawing Sheet

(56) References Cited

U.S. PATENT DOCUMENTS

| | | | |
|---|---|---|---|
| 2009/0117218 A1* | 5/2009 | Niishimura | B01F 15/065 425/144 |
| 2010/0011761 A1 | 1/2010 | Wirbeleit et al. | |
| 2011/0252775 A1* | 10/2011 | Joergl et al. | 60/321 |
| 2012/0266999 A1* | 10/2012 | Wirth | F01N 3/043 138/149 |
| 2013/0199750 A1* | 8/2013 | Levin | F02G 5/02 165/4 |

FOREIGN PATENT DOCUMENTS

| | | | | |
|---|---|---|---|---|
| DE | 102008061026 A1 | | 6/2009 | |
| DE | 10 2008 051278 A1 | | 4/2010 | |
| DE | 102008051278 A1 | * | 4/2010 | F01N 13/102 |
| EP | 0560616 A1 | | 9/1993 | |
| WO | 00/43103 | | 7/2000 | |

* cited by examiner

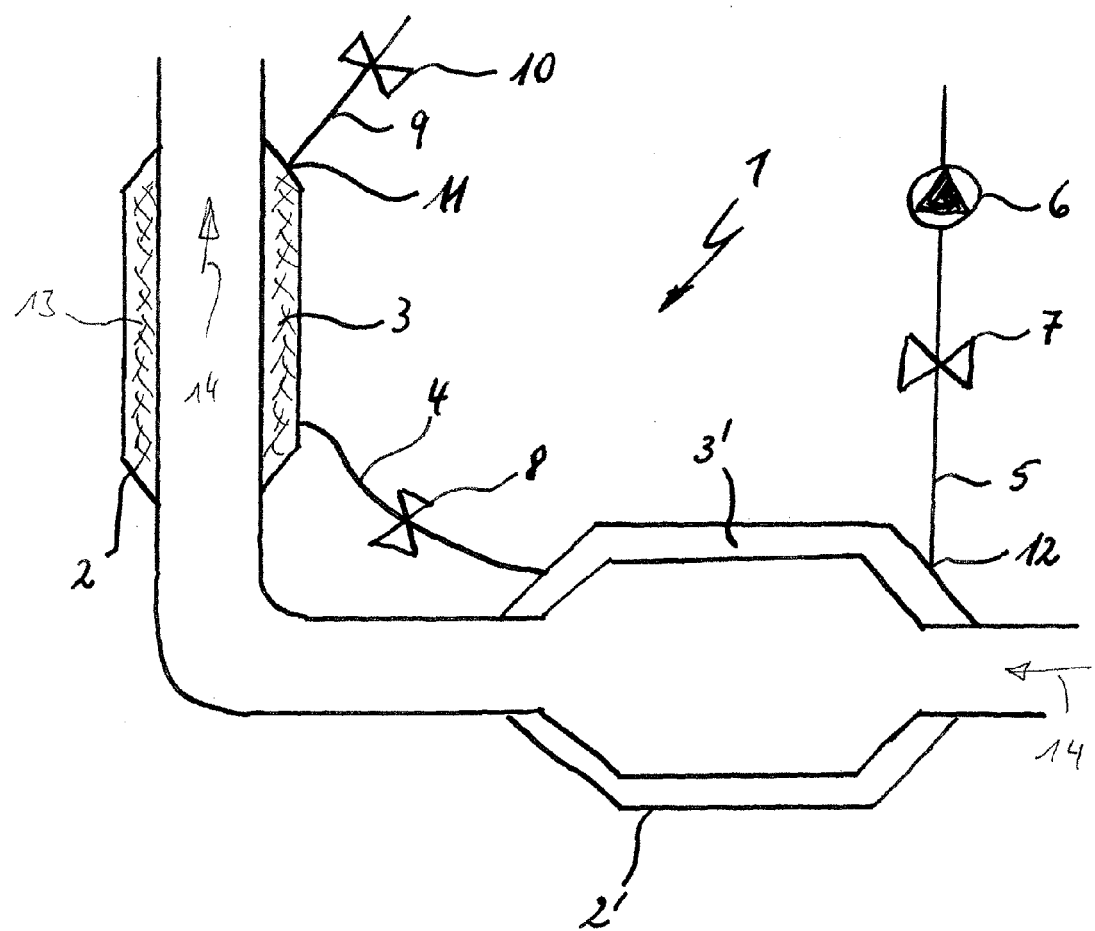

EXHAUST SYSTEM

CROSS REFERENCE TO RELATED APPLICATIONS

This application claims the benefit of priority under 35 U.S.C. §119 of German Patent Application DE 10 2010 031 853.1 filed Jul. 22, 2010, the entire contents of which are incorporated herein by reference.

FIELD OF THE INVENTION

The present invention relates to a component of an exhaust system for a combustion engine particularly of a motor vehicle. In addition, an exhaust system with at least two such components and a method for the operation of an exhaust system are likewise subject of the invention.

BACKGROUND OF THE INVENTION

From EP 0 560 616 A1 an exhaust system having a hollow jacket is known. An intermediate space delimited by the walls of the hollow jacket can be subjected to a vacuum. For this purpose, the intermediate space of the hollow jacket is connected to the air intake of the combustion engine via a vacuum connecting line. Accordingly, when the combustion engine is in operation, its intake of air the fluid present in the intermediate space of the jacket is also sucked out, as a result of which a vacuum is created in this intermediate space. This vacuum generation can be controlled through a vacuum control valve which is arranged in the vacuum connecting line. With this vacuum control valve the intermediate space of the hollow jacket can also be ventilated.

From WO 00/43103 and U.S. Pat. No. 6,162,403 catalytic converters each with an evacuated double-walled jacket are known. In addition, in an evacuated region of the jacket, a material which through a phase transformation at a predetermined temperature can absorb or emit heat is likewise arranged. Thus, upon further heating and also short-term cooling through the phase transformation of the material the catalytic converter is held at a constant temperature for as long as a phase transformation of the material is still possible.

The catalytic converter of U.S. Pat. No. 6,203,764 B1 likewise comprises a double-walled evacuated jacket. In the jacket, hydrogen-absorbing material is arranged. At low temperature the greatest part of the hydrogen is bound by the hydrogen-absorbing material and a vacuum is present in the double-walled jacket. When the catalytic converter heats up during the operation the hydrogen-absorbing material starts to release the hydrogen from a predefined temperature, as a result of which the vacuum in the double-walled jacket drops. Thus, the double-walled jacket at a lower temperature has a higher insulating effect than at higher temperature because of the falling vacuum and the heat convection through the hydrogen molecules that have been liberated.

The exhaust gas re-treatment, particularly the catalytic exhaust gas re-treatment develops its optimum effectiveness only within a predefined temperature interval. Outside this predefined temperature range the effectiveness of the exhaust gas re-treatment falls and/or expires completely. Accordingly, it is necessary particularly with the catalytic components of the exhaust system or also with the entire exhaust system to reduce the heat losses occurring on the exhaust system through insulation. By means of this, the exhaust system and its components can be heated up more quickly particularly during cold starting and among other things the catalytic exhaust gas re-treatment function optimally.

This is particularly desirable in the load ranges, in which the exhaust gas is relatively cold, such as for example during a cold start. In these load ranges a best possible insulation is desired in order to reduce or avoid further cooling down of the exhaust gas. By doing so, the exhaust emission values can be significantly improved and the demanded emission regulations can be adhered to.

However, load ranges wherein the exhaust gas is too hot and the predefined temperature interval of the exhaust gas re-treatment is thus exceeded, can also occur. However, in this case a reduced functionality of the components of the exhaust system in terms of the exhaust gas re-treatment can also occur and consequently at these load points a cooling down of the exhaust gas is not only desirable but even necessary in certain cases. Accordingly, a reduced insulation of the exhaust system and its components is advantageous in these load ranges.

SUMMARY OF THE INVENTION

The present invention thus deals with the problem of providing an improved or at least an alternative embodiment for an insulation of an exhaust system, its components and associated operating method which is more preferably characterized by a more flexible insulation adapted to the respective requirement.

According to the invention, a component of an exhaust system for a combustion engine is provided with a hollow jacket at least partially surrounding the component, with an intermediate space surrounded by the walls of the hollow jacket. The intermediate space is closable in a pressure-tight manner. The intermediate space is fluidically connected to a vacuum generating device through a vacuum connection line and via a vacuum connection point of the component, by means of which a vacuum can be generated in the intermediate space.

According to a further aspect of the invention, an exhaust system is provided including the component with the intermediate space surrounded by the walls of the hollow jacket. A vacuum generating device is fluidically connected to the intermediate space via at least one vacuum connection line. The system advantageously may comprise at least two of the components, wherein the intermediate spaces of the at least two components are fluidically connected to each other by means of an intermediate space connection line.

According to a further aspect of the invention, a method is provided for operating an exhaust system. The method comprises providing at least one component with an intermediate space surrounded by a hollow jacket. The intermediate space can be closed off in a pressure-tight manner. As a function of at least one of the temperature of the respective component and the exhaust temperature, in a respective component portion of the exhaust system, at least one of a vacuum and a fluid flow in the intermediate space is set. In a first temperature region in the intermediate space a vacuum is present.

The invention is based on the general idea of designing the insulation of an exhaust system for a combustion engine, particularly of a motor vehicle, or its components through a hollow jacket at least partially surrounding the components or the exhaust system, wherein by the walls of the hollow jacket an intermediate space that can be closed off in a pressure-tight manner is formed, and to fluidically connect the intermediate space through a vacuum connecting line and via a vacuum connecting point of the component or exhaust system to a vacuum generating device, by means of which a vacuum can be generated in the intermediate space, and to at least partially support the intermediate space through a support structure and/or a fiber material and/or a foam.

Through a hollow jacket evacuatable in such a manner, whose intermediate space is fluidically connected to a vacuum generating device, the insulating effect of the hollow jacket can be adapted to the respective requirement situation by adjusting of the vacuum. Thus, a flexible insulation of the exhaust system and/or its components to suit the requirement is possible, as a result of which the exhaust emission values can be significantly improved.

An exhaust system can be at least partially surrounded or only a component of an exhaust system can be at least partially surrounded by such a hollow jacket. As such a component the pipeline of the exhaust system can preferably be equipped with such a hollow jacket. Particularly preferably, additional components of the exhaust system such as for example a catalytic converter funnel, a catalytic converter housing, additional pipes and pipe connection pieces, a particle filter, an SCR (selective catalytic reduction) catalytic converter, an NSK (NOx storage catalytic converter), an AdBlue metering module, a metering socket, an elbow, acoustic components such as for example a silencer, an active silencer, actuators or the like, a fuel processor housing, a mixing section for the fuel processor, an HWL (urea hydrogen solution) metering device, a turbocharger, a primary tube, a condensation cooler, a collection vessel, a return line, an advance line or the like can also be insulated with such a hollow jacket.

The walls of such a hollow jacket enclose an intermediate space, which among others is closed through the walls of the hollow jacket in a pressure-tight manner.

Between the walls, at least partially, filler material can be arranged. This filler material can be preferably designed as thermal insulator and have a suitably insulating effect as a result of which the radiation heat exchange between the walls of the hollow jacket is reduced. In addition, the insulating material can also exercise a supporting function so that advantageously a greater stability of the hollow jacket is provided due to the mutual supporting of the walls. Advantageously, material can be saved in this manner since because of the increased stability the walls at least in part regions can be designed thinner.

For example, the filler material can be formed in the intermediate space of the hollow jacket at least in part regions through a fiber mat, preferably a ceramic fiber mat, a closed-pore foam structure, preferably an open-pore foam structure, a foam structure from ceramic or metal material, mineral wool, glass wool or the like. Likewise, the filler material can be ceramic paper, comparatively thin (thickness smaller than 0.2 mm) sheets or foils of a thermally poorly conducting metal or plastic, wherein the sheets or foils can be profiled, particularly corrugated, and can be placed in multiple layers on top of one another, between which layers hollow spaces are formed.

Preferably, the intermediate space is at least partially foamed out with a foam, wherein the foam at least partially preferably consists of a foam ceramic, preferably expanded clay, preferably of foam glass, preferably of a metal foam, particularly preferably of a plastic foam or other foamable materials. In addition, alternatively or additionally to this, a support structure can be provided, such as for example a corrugated sheet, dimples, beads and/or the like.

A foam is to mean a material of cellular construction, wherein the cell walls of the cellular materials surround hollow spaces at least partially. If the foam is of the closed-pore type the individual hollow spaces are surrounded by closed cell walls. Fluids cannot substantially flow through such a foam. In the case of open-porous foam the individual hollow spaces are fluidically interconnected so that in this case a fluid is able to flow through such an open-porous foam.

A fluid is to mean gases and liquids as well as vapours, aerosols and mixtures thereof.

The hollow jacket can be designed in different ways. Preferably, here, a supporting pipe or supporting housing is at least partially surrounded by a wall particularly formed from sheet metal on the outside and/or inside. Between the housing or pipe and the wall the evacuatable intermediate space is then formed. The wall positioned on the inside and/or outside is connected to the pipe or housing through welding, seaming, folding or the like so that the intermediate space is formed in a pressure-tight manner. The hollow jacket is thus formed through the housing or the pipe together with the walls.

Likewise preferably, the pipe or housing on the inside and/or outside can be at least partially surrounded by a more preferably non-supporting, double-walled jacket. This double-walled jacket can likewise be connected to the pipe or housing through welding, seaming, folding or the like. Here, the intermediate space is arranged between the walls of the double-walled jacket and designed in a pressure-tight manner. The hollow jacket in this case is formed by the double-walled jacket.

In addition, the formation of the intermediate space between two supporting housing walls and/or pipes is also conceivable, wherein the housing walls or pipes are closed off relative to each other in a pressure-tight manner through welding, seaming, flanging or the like.

In this case, the hollow jacket is formed through the housing walls and/or pipes.

Deformation of a plurality of evacuatable intermediate spaces on the component and/or on the exhaust system is likewise conceivable, which intermediate spaces are fluidically interconnected by means of intermediate space connecting lines. In such an intermediate space connection line a pressure control device, such as for example a valve, can also be arranged.

Preferably at least one such intermediate space at a vacuum connection point of the hollow jacket is fluidically connected to a vacuum generating device by way of a vacuum connecting line. By means of the vacuum generating device the hollow jacket or the intermediate space delimited by the walls of the hollow jacket can be subjected to a vacuum.

Vacuum is to mean a pressure that is lower than the ambient pressure. If in part the term "evacuated" is used, this does not exclusively and necessarily mean that in the intermediate space an absolute vacuum is generated, but that in the intermediate space a lower pressure compared with the ambient pressure is likewise present.

Preferably, the intake tract of the combustion engine is used as vacuum generating device, particularly when the combustion engine is a naturally aspirated, that is non-charged engine. Then, relatively low pressures can be realized at part load downstream of a throttle valve. To this end, the intake vacuum of the combustion engine is utilized. Advantageously, only the vacuum connection line has to be connected to the intake tract for this purpose. In addition, with running combustion engine, the intermediate space can be automatically subjected to a vacuum, so that the vacuum generation need not be guaranteed through additional components.

Furthermore it is also conceivable to use a vacuum pump as vacuum generating device, preferentially when the combustion engine is a charged engine, wherein thus a charging device, e.g. an exhaust gas turbocharger, is arranged in the fresh air system. In this case, the vacuum pump can be used for example which provides the vacuum for the brake booster. Advantageously, no additional vacuum generating component is necessary in this embodiment either.

However, it is also conceivable that an additional vacuum pump as vacuum generating device is employed, which is exclusively responsible for the vacuum generation in the intermediate space. In a further embodiment the vacuum connection line can also be connected to the compressor-sided intake tract of a charging device, particularly of an exhaust gas turbocharger and the vacuum in the intermediate space be generated through the compressor side of the charging device.

In the case of a charged combustion engine an additional vacuum pump is required for realizing—as explained—an evacuation significantly improving the thermal insulation, while for realizing a sufficiently large cooling airflow through the respective insulated component the comparatively low vacuum in the fresh air system upstream of the respective charging device is already sufficient so that the vacuum pump can remain switched off for this purpose, which has a electricity or energy saving effect.

The vacuum connection line fluidically connects the intermediate space to the respective vacuum generating device via the vacuum connecting point of the hollow jacket, so that through sucking the fluid out of the intermediate space by means of the vacuum generating device the intermediate space can be subjected to a vacuum.

In the vacuum connection line a non-return valve or any other switchable valve device can be preferably arranged. This has the advantage that the vacuum need not be permanently generated by the vacuum generating device, and that the vacuum in the intermediate space only partially has to follow the pressure fluctuations of the vacuum generating device.

Advantageously, when using a non-return valve, the vacuum is generated at the start of operation and thereafter held by the non-return valve. In the case of a separate vacuum generating device the vacuum generating device can be switched off following the generation of the vacuum. This is energetically particularly advantageous when the vacuum is established exactly through such a separate vacuum generating device.

Particularly preferably, alternatively or additionally, a control valve is arranged in the connecting line. By means of a simple control valve the level of the vacuum can be regulated. Particularly preferably, the control valve comprises a ventilation function. Thus, the control valve can advantageously also carry out the ventilation of the intermediate space and in this case a quick change between high and low vacuum levels is advantageously possible with a component, namely the control valve. Thus in this case, too, a quick change between high and low insulating effect can be carried out within the shortest time.

A vacuum in the intermediate space improves the insulating effect through reduction of the convection and heat conductants through the gas fluid present in the intermediate space. Preferably, the vacuum is generated temporarily only during the operation of the motor vehicle. It is advantageous because of this that even with minor leakages a uniform pressure level can be established in the vacuum system time and again. In contrast with a permanent vacuum, wherein a leakage finally results in a permanent loss of the vacuum in the intermediate space. In addition, the vacuum can be advantageously only established when it is required.

Preferably the vacuum is controllable for example through a control valve, a ventilation device and/or through a non-return valve. Thus, depending on the requirement, the vacuum can be increased or reduced in order to achieve the respective desired insulating effect. Because of this, the optimum temperature interval particularly for the catalytic component of the exhaust system can be maintained, so that the particularly catalytic components of the exhaust system have an optimum efficiency of the exhaust gas re-treatment and the exhaust emission values can thus be adhered to.

Particularly preferably the hollow jacket comprises a ventilation connection point which fluidically connects the intermediate space to a ventilation device via a connecting line. By means of the ventilation device the intermediate space evacuated in the process can be ventilated so that the vacuum prevailing in the intermediate space can be reduced.

Particularly preferably, the ventilation device is directly connected to the ventilation connection point of the hollow jacket without connecting line located in between.

Particularly preferably, the ventilation connection point is arranged downstream of the vacuum connection point on the hollow jacket. Through such an arrangement of the ventilation connection point and vacuum connection point it is possible, with active vacuum generating device and opened ventilation device, to suck a fluid flow through the tank out of the hollow jacket. Advantageously, in this case, the fluid flow can be used for cooling. Through the fluid flow flowing through the hollow jacket the exhaust gas flowing through the exhaust system is thus also cooled and the upper limits of a temperature interval of the respective, particularly catalytic component of the exhaust system can also be adhered to.

An entire exhaust system or part regions of the exhaust system can be surrounded by such a hollow jacket. It is likewise conceivable that components of an exhaust system at least in part regions are surrounded by such a hollow jacket.

Such an evacuatable insulation can be controlled or regulated. There, the exhaust temperature can be used as one of the regulating quantities for the control or regulation. The level of the vacuum or of the gas flow flowing through the hollow jacket is thus set by way of the exhaust temperature. To this end, the control valves in a simple form can also be designed as bimetal, as a result of which automatic regulation of the vacuum level or of the fluid flow is made possible. Component-based, the temperature of the respective component can also be utilized as regulating quantity for the control of such an insulating device.

As a function of the temperature of the respective component and/or of the exhaust temperature, particularly in the respective component portion of the exhaust system, a vacuum and/or a fluid flow can thus be set in the intermediate space. In a first temperature region a high to medium vacuum can be set in the intermediate space. In a second temperature region an ambient pressure or a low vacuum is set in the intermediate space and preferably in a third temperature region a fluid flow flows through the intermediate space. Here, the first temperature region is positioned in a lower temperature level than the second temperature region and the second temperature region is positioned in a lower temperature level than the third temperature region. The limits of the temperature regions can overlap here. In addition, at least one limit value of the first and/or of the second and/or of the third temperature region of at least two components can likewise have a different value.

It is to be understood, that the features mentioned above and still to be explained in the following cannot only be used in the respective combination stated but also in other combinations or by themselves, without leaving the scope of the present invention.

A preferred exemplary embodiment of the invention is shown in the drawing and will be explained in more detail in the following description. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 1 is a schematic view showing an exhaust system with two intermediate spaces connected to each other.

DESCRIPTION OF THE PREFERRED EMBODIMENTS

Referring to the drawings in particular, according to FIG. 1, an exhaust system 1 has two components, each with a hollow jacket 2, 2'. The two hollow jackets 2, 2' are fluidically connected to each other. As shown in FIG. 1, each of the hollow jackets 2, 2' surrounds an intermediate space 3, 3'. By way of an intermediate space connection line 4 the two hollow jackets 2, 2' or the two intermediate spaces 3, 3' are fluidically connected to each other. At least one of the hollow jackets 2' is fluidically connected to a vacuum generating device 6 by way of a vacuum connection line 5. An exhaust flow direction is indicated by an arrow 14.

At least one of the intermediate spaces 3 is at least partially be filled with a filler material 13, which practically is designed as thermal insulator. The filler material 13 is such that a fluid flow can flow through the filler material 13. The filler material 13 in addition can have a certain supporting function in order to stiffen the double walls of the respective component.

In the vacuum connection line 5 a vacuum regulating device 7 can be arranged, which additionally can have a ventilation function. With the vacuum regulating device 7, which for example can be designed as control valve, the vacuum is controllable at least in the intermediate space 3'.

In the intermediate space connection line 4 a pressure control device 8 can be arranged, which additionally can likewise have a ventilation function. With the pressure control device 8, which for example can be likewise designed as control valve, the vacuum is controllable at least in the intermediate space 3.

In addition, at least one hollow jacket 2 or intermediate space 3 can be connected to a ventilation device 10 via a ventilation connection line 9. By means of the ventilation device 10 at least this intermediate space 3 can be ventilated.

The ventilation connection line 9 is fluidically connected to the intermediate space 3 by way of a ventilation connection point 11. The vacuum connection line 5 is fluidically connected to the intermediate space 3' by way of a vacuum connection point 12. Preferably, the vacuum connection point 12, with respect to the airflow, is arranged downstream of the ventilation connection point 11, on one of the hollow jackets 2, 2'. Furthermore, the vacuum connection point 12 with respect to the exhaust flow is arranged upstream of the ventilation connection point 11 on one of the hollow jackets 2, 2', as a result of which a counter flow cooling can be realized. With open ventilation device 10 and running vacuum generating device 6 a fluid, preferentially air from the fresh air system, can flow through at least one intermediate space 3, 3' and be cooled by such a fluid flow.

While specific embodiments of the invention have been shown and described in detail to illustrate the application of the principles of the invention, it will be understood that the invention may be embodied otherwise without departing from such principles.

What is claimed is:
1. A component of an exhaust system for a combustion engine, the component comprising:
a hollow jacket wall forming a first component exterior and with a first intermediate space surrounded by the hollow jacket wall and which hollow jacket wall comprises a ventilation connection point, the first intermediate space being fluidically connected to a ventilation device via a ventilation connection line and via the ventilation connection point, whereby fluid can be supplied to the first intermediate space from an area surrounding the component;
another hollow jacket wall forming another component exterior and with a second intermediate space surrounded by the another hollow jacket wall, said another hollow wall being closed except for at least one connection point that is closable in a pressure-tight manner, wherein the at least one connection point comprises a vacuum connection point and the second intermediate space is fluidically connected via the vacuum connection point to a vacuum generating device through a vacuum connection line; and
an intermediate connecting line, said first intermediate space and said second intermediate space being connected in series via said intermediate connecting line, wherein said ventilation connection point and said vacuum connection point are selectively opened and closed to create a vacuum in the second intermediate space and to create ambient pressure in the first intermediate space.
2. The component according to claim 1, wherein the ventilation connection point is arranged downstream or upstream of the vacuum connection point, wherein fluid flows from the first intermediate space to the second intermediate space via the intermediate connecting line when the ventilation connection point is in fluid communication with the area surrounding the component.
3. The component according to claim 1, wherein the hollow jacket wall comprises a supporting pipe, the supporting pipe being positioned at an inside or at an outside of the hollow jacket wall, the one component being arranged opposite a first portion of an exhaust fluid flow path, the another component being arranged opposite a second portion of the exhaust fluid flow path;
the hollow jacket wall has an inside or an outside comprising a jacket pipe, whereby the first intermediate space is formed between the supporting pipe and the jacket pipe.
4. The component according to claim 1, wherein the hollow jacket wall has an inside or an outside comprising a double-walled pipe, whereby the intermediate space is defined by walls of the double-walled pipe, the intermediate connecting line extending exclusively between the one com- ponent and the another component, the vacuum being provided in the second intermediate space when said ambient pressure is provided in the first intermediate space.

5. An exhaust system comprising:
a component with a hollow jacket wall forming a component exterior and with an intermediate space surrounded by the hollow jacket wall and which hollow jacket wall is closed except for a plurality of connection points that are selectively closable in a pressure-tight manner;
a vacuum connection line;
a vacuum generating device fluidically connected to the intermediate space via one of the plurality connection points through the vacuum connection line, said vacuum generating device generating a vacuum in the intermediate space;
another component with another component hollow jacket wall forming another component exterior and with another component intermediate space surrounded by the another component hollow jacket wall, the another component hollow jacket wall being closed except for a plurality of other component connection points that are selectively closable in a pressure-tight manner;
a ventilation line;
a ventilation device, said another component intermediate space being connected to said ventilation device via said ventilation line, said ventilation device generating an ambient pressure in said another component intermediate space; and
an intermediate space connection line, wherein the intermediate space and the another component intermediate space are connected to each other by the intermediate space connection line, wherein a fluid flow path is defined by said ventilation device, said ventilation line, said another component intermediate space, said intermediate space connection line and said intermediate space, wherein fluid passes from an area surrounding the another component to said intermediate space via said fluid flow path.

6. The exhaust system according to claim 5, further comprising a vacuum regulating device wherein the a vacuum regulating device is arranged in the vacuum connection line, said another component intermediate space and said intermediate space being connected in series.

7. The exhaust system according to claim 5, wherein:
the plurality connection points further comprises a ventilation connection point;
the intermediate space is fluidically connected to the ventilation device via the ventilation connection line and via the ventilation connection point; and
the component is arranged opposite one portion of an exhaust fluid flow path, the another component being arranged opposite another portion of the exhaust fluid flow path.

8. An exhaust system comprising:
a ventilation device;
a ventilation connection line;
a component with a hollow jacket wall forming a component exterior and with an intermediate space surrounded by the hollow jacket wall and which hollow jacket wall is closed except for at least one connection point that is closable in a pressure-tight manner, said at least one connection point comprising a ventilation connection point, the intermediate space being fluidically connected to the ventilation device via the ventilation connection line and via the ventilation connection point, wherein ambient pressure is generated in said intermediate space via said ventilation device;
a vacuum connection line;
a vacuum generating device;
another component with another component hollow jacket wall forming another component exterior and with another component intermediate space surrounded by the another component hollow jacket wall, the another component hollow jacket wall being closed except for at least one another component connection point that is closable in a pressure-tight manner, said vacuum generating device being fluidically connected to the another component intermediate space via a vacuum connection point through the vacuum connection line, said vacuum generating device generating a vacuum in said another component intermediate space;
an intermediate space connection line, wherein the intermediate space and the another component intermediate space are fluidically connected to each other by the intermediate space connection line;
a pressure control device wherein the pressure control device is arranged in the intermediate space connection line, whereby said pressure control device is arranged between the component and the another component, wherein a fluid flow from said intermediate space to said another component intermediate space is controlled via said pressure control device as a function of an exhaust gas in the exhaust system and a temperature of at least one of the component and the another component.

9. A method for operating an exhaust system, the method comprising the steps of:
providing an exhaust system component with a hollow jacket wall forming a component exterior and with an intermediate space surrounded by the hollow jacket wall and which hollow jacket wall is closed except for a plurality of connection points that are selectively openable and closable in a pressure-tight manner;
generating a vacuum at one of the plurality of connection points;
selectively opening and closing the plurality of connection points to selectively create a vacuum, a pressure, and a fluid flow in the intermediate space as a function of a temperature of one of the component and an exhaust gas in the exhaust system;
providing another exhaust system component with a hollow jacket wall forming a component exterior and with an intermediate space surrounded by the hollow jacket wall and which hollow jacket wall is closed except for a plurality of connection points that are selectively closable in a pressure-tight manner;
providing an intermediate space connection line connecting one of the connection points of the component to one of the connection points of the another component;
selectively opening and closing said plurality of connection points of the component and the another component to create a vacuum in the one component and create ambient pressure in the another component.

10. A method in accordance with claim 9, wherein:
when the temperature is within one range, said selectively opening and closing creates vacuum in the intermediate space.

11. A method in accordance with claim 10, wherein:
when the temperature is within another range, said selectively opening and closing creates an ambient pressure in the intermediate space.

12. A method in accordance with claim 10, wherein:
when the temperature is within another range, said selectively opening and closing creates a fluid flow in the intermediate space.

13. A method in accordance with claim 9, wherein:
said selective opening and closing of all of the connection points are performed as a function of the temperature.

14. A component of an exhaust system for a combustion engine, the component comprising:
a hollow jacket wall forming a component exterior of a component, a hollow of said hollow jacket wall forming a first intermediate space, said hollow jacket wall comprising a ventilation connection opening, the first intermediate space being fluidically connected to a ventilation device via said ventilation connection opening, whereby fluid can be supplied to the first intermediate space from an area surrounding the component;
another hollow jacket wall forming another component exterior of another component and with a second intermediate space surrounded by the another hollow jacket wall, said another hollow wall being closed except for at least one connection point that is closable in a pressure-tight manner, wherein the at least one connection point comprises a vacuum connection point and the second intermediate space is fluidically connected via the vacuum connection point to a vacuum generating device through a vacuum connection line, whereby a vacuum can be generated in the second intermediate space; and
an intermediate connecting line, said first intermediate space being connected to said second intermediate space via said intermediate connecting line, wherein said ventilation connection opening and said vacuum connection point are selectively opened and closed to selectively create a vacuum in the second intermediate space, an ambient pressure in the first intermediate space, and a fluid flow in the intermediate space as a function of an exhaust gas in the exhaust system and a temperature of at least one of the component and the another component.

15. A component according to claim 14, wherein said vacuum generating device is in flow connection with said second intermediate space, said vacuum generating device selectively forming the vacuum in said second intermediate, said ventilation device being in flow connection with said first intermediate space, said ventilation device selectively supplying a fluid from the area surrounding the component to said first intermediate space, said component exterior being arranged opposite a portion of an exhaust fluid flow path, said another component exterior being arranged opposite another portion of the exhaust fluid flow path.

16. A component according to claim 15, wherein:
said hollow jacket wall comprises one opening and said another opening, said one opening and said another opening being arranged on opposite ends of said hollow jacket wall, said hollow jacket wall defining a heat exchange interface between an exhaust fluid flow and said first intermediate space, said another hollow jacket wall defining another heat exchanger interface between the exhaust fluid flow and said second intermediate space.

17. A component according to claim 15, wherein:
said another hollow jacket wall comprising one opening and said another opening, said one opening and said another opening being arranged on opposite ends of said another hollow jacket wall, and arranged to selectively cause a fluid flow through said hollow jacket wall from said ventilation device to said vacuum generating device.

18. A component according to claim 14, further comprising:
a pressure control device arranged in series between said intermediate space and said another intermediate space to selectively control a pressure in one of said intermediate space and said another intermediate space, said intermediate space and said another intermediate space being connected in series.

19. A component according to claim 18, wherein a flow of fluid between said first intermediate space and said second intermediate space is controlled via at least said control device, said control device being located between said first intermediate space and said second intermediate space.

20. A component according to claim 18, wherein a flow of fluid between said first intermediate space and said second intermediate space is controlled via at least said control device, said control device being located between said first intermediate space and said second intermediate space.

* * * * *